TRANSISTOR CURRENT LIMITER
Filed March 29, 1956
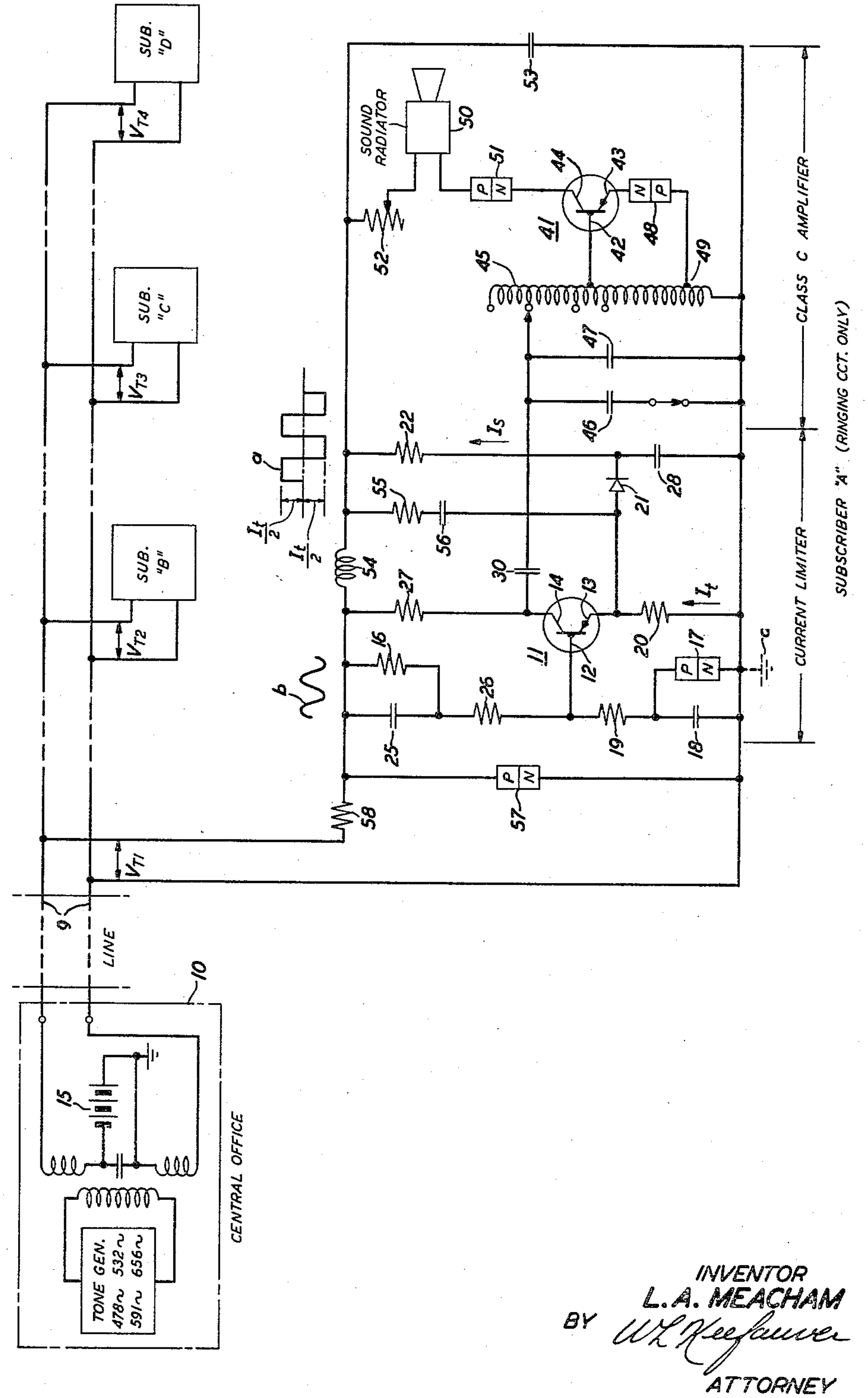
INVENTOR
L. A. MEACHAM
BY W. L. Keefauver
ATTORNEY 2,850,650
Patented Sept. 2, 1958

2,850,650

TRANSISTOR CURRENT LIMITER

Larned A. Meacham, New Providence, N. J., assignor to Bell Telephone Laboratories, Incorporated, New York, N. Y., a corporation of New York Application March 29, 1956, Serial No. 574,714

12 Claims. (Cl. 307—88.5)

This invention relates to circuits for limiting the peak-to-peak amplitude of an applied signal. In the illustrative embodiments described below, the invention takes the form of circuits which are sometimes known as either current limiters or slicers.

An object of the present invention is to accurately limit the peak-to-peak amplitude of an applied signal.

Another object of the invention is to produce, from a signal which may be generally sinusoidal in form, a rectangular waveform having symmetrical positive and negative portions with respect to an arbitrary axis and having positive and negative portions of substantially identical durations.

Another object of the present invention is a transistor current limiter which is relatively independent of variations in $I_{c0}$.

Another object of the present invention is to produce, from an applied signal having a predominant fundamental frequency, an output wave, likewise strong in the fundamental frequency, but substantially devoid of any even order harmonics.

Another object of the present invention is to produce, for a tuned circuit or the like, a driving current having a relatively constant peak-to-peak amplitude.

Another object of the present invention is to produce, from an input signal which may have one of several fundamental frequencies, an output waveform by means of which it is possible to discriminate readily between a desired fundamental and adjacent undesired frequencies.

In a specific embodiment of the invention, described in more detail below for purposes of illustration, the invention is embodied in a circuit designated a current limiter. This current limiter is an important stage in a tone ringer circuit for selective ringing in a party-line telephone system wherein signalling is accomplished by signals whose frequencies lie within the band of the speech currents themselves. The output stage of the tone ringer is a Class C amplifier whose output is coupled to a sound radiator. Selectivity is achieved, in part, by a resonant input circuit for the Class C amplifier which is tuned to a particular frequency assigned to an individual subscriber.

The signalling waves themselves are generally sinusoidal in form. Although they are chosen to differ from each other by a ratio of 1.1 to 1, they lie sufficiently close that means are necessary to prevent the Class C amplifier from responding to adjacent signalling frequencies or harmonics thereof.

In accordance with principles of the invention, these means comprises a transistor circuit connected in common-emitter configuration and biased normally conducting by a constant voltage device. A negative feedback resistor is connected in series with the emitter. Approximately fifty percent of the normal emitter current is by-passed around the transistor by a first by-pass circuit. The bias on the transistor is such that as the input signal swings between its peak excursions, the emitter current is either reduced to zero when the transistor cuts off or increased to full output when the two by-pass circuits are effectively disabled. Accordingly, the output current is tightly regulated at a peak-to-peak value approximately equal to the full emitter current of the normally conducting transistor.

A feature of this circuit is that $I_{c0}$ does not pass through the by-pass circuit in which the limiting level is determined, so that variations in this current have practically no effect on the peak limited output.

These and other features and objects of the invention will be more fully understood by considering the following detailed description when read in accordance with the single figure of the drawing which shows a tone ringing circuit for a party-line telephone system which includes a current limiter embodying principles of the invention.

The attached figure illustrates four telephone subscribers, designated subscribers A, B, C, and D, bridged on a common or party line 9 which extends to a central office 10. The ringing or signalling circuit only of subscriber A is illustrated in detail; the ringing circuits of the other subscribers are assumed to be similar and the speech circuits have not been illustrated since they form no part of the present invention.

Signalling is accomplished by four frequencies which lie in the voice frequency range. These frequencies, 478, 532, 591, and 656 cycles, are chosen so that the ratio of adjacent frequencies is 9 to 10 and may be interrupted at a low frequency in order to give the resulting sound a distinctive character. This ratio insures that neither second nor third harmonics of the lower frequencies coincide with the fundamentals of any of the higher frequencies, particularly where the same series of frequencies is extended upward to accommodate more than four parties or for other purposes. It is assumed that these four frequencies are assigned, respectively, to subscribers A, B, C, and D. If eight parties were assigned to a common line on a full-selective basis, the additional signalling frequencies would be 729, 810, 900, and 1000 cycles.

Each ringing circuit, or tone ringer, as it may be called, is therefore equipped with a frequency selective circuit responsive to the particular frequency assigned to its associated subscriber, and with means for radiating the selected tone when received.

Frequency selectivity is achieved, in part, by the output stage which comprises a Class C amplifier having a tuned input circuit. Since high Q circuits are expensive to build, it is impracticable to obtain sufficient selectivity from the tuning elements alone. The use of Class C amplification contributes a major part of the selectivity, in that it gives no output unless the response of the tuned circuit exceeds a certain minimum amplitude. The band of frequencies for which the amplifier gives output is thus a function of the amplitude of the current driving the tuned circuit. Also, as may be seen from the illustrative signalling frequencies given above, it is important to provide discrimination against second harmonics, particularly of lower signalling frequencies, so that ringers assigned the higher frequencies will not respond to second harmonics of the lower frequencies. Accordingly, still further frequency discrimination is achieved by the current limiter stage preceding the amplifier which derives from the signalling waves a rectangular waveform *a* having a closely regulated peak-to-peak amplitude, so as to provide a constant driving current, and one which is symmetrical both with respect to an arbitrary zero axis and with respect to the duration of the positive and negative portions. The constancy of amplitude insures uniformity of bandwidth, and the symmetries insure that the second harmonic components of the input waves will be zero. The third harmonic components are unimportant here, as they fall above above the range covered by ringing frequencies for as many as eight parties, the largest number contemplated in this embodiment.

The specific circuit illustrated will now be described in detail. The current limiter stage of the tone ringer comprises a p-n-p junction transistor 11 having base 12, emitter 13, and collector 14. Biasing and operating voltages for this transistor are provided by the source of direct current 15 located at the central office. The base of the transistor is given a fixed bias by a voltage divider connected across the line and comprising, primarily, resistor 16 and a p-n junction silicon breakdown diode 17 by-passed for alternating currents by capacitor 18. The values of resistors 19 and 26 are low relative to the direct-current resistance of resistor 16 and diode 17, and may be neglected for the moment. The collector 14 is returned to the negative line terminal by load resistor 27.

The silicon diode 17 may be of a type described in an article by Messrs. F. H. Chase, B. H. Hamilton, and D. H. Smith entitled "Transistors and Junctions Diodes in Telephone Power Plants," Bell System Techanical Journal, July 1954, volume 33, page 827. The significant characteristic of this diode is that it exhibits a substantially constant voltage across its terminals for applied reverse biases which exceed a critical or breakdown voltage. In the illustrative embodiment, a diode 17 is selected which has a breakdown voltage of 9.4 volts so that the base 12 of the transistor with respect to an arbitrary reference point *c*, actually the positive line terminal, has a fixed bias of about 9.4 volts.

A self-biasing resistor 20 is connected in series with the emitter electrode and serves to stabilize the emitter current by negative feedback. The transistor, in fact, regulates the voltage across this resistor to be approximately the same as the voltage across the diode 17. The bias on the base is sufficient to bias the transistor normally conducting so that a current $I_t$ normally flows through resistor 20. This current, in fact, is held substantially constant at this value.

In accordance with principles of the invention, fifty percent of this regulated current $I_t$ is by-passed around the transistor by a circuit including a diode 21 and a resistor 22 which is connected to the negative line terminal. In the absence of applied signals, diode 21 is conducting and hence a low resistance. The remaining fifty percent of $I_t$ flows through the collector and resistor 27.

Signal input is coupled to the base by a capacitor 25 and resistors 26 and 19. (The diode 17 and by-pass capacitor 18 represent a substantially zero alternating-current impedance.) As the input signal swings the base above its mean bias potential, the chosen bias is such that the transistor is driven to cut-off by the positive peaks of the input signal. As the input signal swings the base below its mean bias potential, the emitter current of transistor 11 increases until it becomes equal to $I_t$, which remains substantially constant. As a result the current through diode 21 falls to zero, and this diode cuts off. Furthermore, when the diode 21 is conducting, it has a low resistance, and under this condition, the emitter 13 faces a low impedance produced by capacitor 28 in series with the diode 21, effectively by-passing resistor 20 for signal current. As a result, the rate of change of emitter current with base voltage is rapid over the region between cut-off of the transistor 11 and cut-off of the diode 21. When diode 21 becomes nonconducting, however, the impedance faced by the emitter rises to the relatively large value determined by resistor 20 (93,100 ohms in a specific embodiment). This large impedance provides a sufficient amount of negative feedback so that any appreciable further increase in emitter current is prevented. Accordingly, the variation in emitter current is limited at $I_t$, peak-to-peak. Since most of this emitter current passes through the collector 14, the latter delivers, at high source impedance, a square wave of current limited at $\pm I_t/2$ which flows through capacitor 30 to the input of the Class C amplifier.

It may be noted that $I_{c0}$ flows through a path including resistors 27 and 19. This affects the direct-current collector potential and to a small amount the bias on the base, but its variations with temperature, aging, or from one transistor to another, have no appreciable affect on the peak-limited output since the same amount of $I_{c0}$ is added, as a bias, to both the positive and negative swings of the output current. The limiting value is determined approximately by current flowing through resistor 20, a path which does not include $I_{c0}$.

In this circuit, the base never accepts more than a few microamperes of signal input current. Its alternating-current input impedance is almost infinite except for a small range of signal voltages near zero (resistor 26 insures that the impedance facing the loop will be sufficiently high at these low amplitudes) and symmetrical for positive and negative swings. Accordingly, the sigal voltage at the base is almost a pure sine wave. This is important because of the following considerations. In order that the clipped current delivered to the tuned input circuit of the amplifier may contain a uniform amount of the fundamental component, its duty cycle should remain fairly constant, as well as its peak amplitude. Moreover, since the second harmonic of the lowest signal frequency (478 cycles) falls about midway between the two highest ones for eight parties (900 and 1000 cycles), it is desirable that the second harmonic of the signal frequency be kept small by holding the duty cycle close to fifty percent. That is, the timing of the square wave should not only be stable, but also symmetrical in order to maintain sensitivity margins and to avoid the possibility of false signalling by the second harmonic of the 478-cycle signalling frequency.

If $I_t$ is the total direct current flowing in resistor 20 and $I_s$ is the by-pass direct current flowing in resistor 22, it can be shown that the ratio of the durations $t_1$ and $t_2$ of the two half-cycles of the square wave is $$\frac{t_1}{t_2}=\frac{I_s}{I_t-I_s}$$

The "duty cycle" may be expressed as $$\frac{t_1}{t_1+t_2}=\frac{I_s}{I_t}$$

Resistors 20 and 22 are, therefore, chosen in relation to the expected average on-hook loop potential and the bias voltage, from diode 17, to make $I_s$ half as large as $I_t$. Some departure from the ideal fifty-fifty division of current can be tolerated, however.

The collector resistor 27 is chosen with several conflicting considerations in mind. From an alternating-current standpoint, a large value is desirable so that all of the alternating current will flow into the tuned circuit even at resonance. From a direct-current standpoint, a small value is desirable so that the total direct-current voltage drop will not exceed the available collector voltage. A value of 240,000 ohms was found acceptable in one embodiment from both standpoints. It might be noted that resistor 27 also controls the value of a small alternating current which flows from the line through resistor 27, capacitor 30 and the resonant input circuit of the Class C amplifier. This current is proportional to the alternating-current signal voltage on the line and 180° out of phase with the main driving current in the resonant circuit. This out-of-phase current provides compensation for slight imperfection in the regulation of the current limiter stage.

Turning now to the Class C amplifier; this amplifier comprises a p-n-p transistor 41, having base 42, emitter 43, and collector 44 electrodes. A resonant input circuit comprises the coil 45, provided with selectable taps, and a pair of capacitors 46 and 47. A substantially constant voltage drop, equivalent to a small negative bias, is applied in series with the emitter by a p-n junction silicon diode 48 which may be similar to diode 17, but which is connected with opposite polarity, having a breakdown voltage in the "forward" direction on the order of .6 volt. Base current flows at each negative voltage peak, driving the transistor to saturation; the transistor 41, therefore, behaves as a switch which opens and closes the collector-emitter path at an audio frequency rate and delivers energy which is converted to audible sound by the sound radiator 50. The sound level may be adjusted by potentiometer 52. A pulse of collector current flows through this radiator for a portion of each cycle, generating the tone ringer audible output. The capacitor 46 is made selectable and the coil 45 is provided with several taps so that the desired tuning frequencies are available by selection of various tap-capacitor combinations.

The alternating-current output circuit for transistor 41 is completed through capacitor 53. This capacitor, together with coil 54, form a low pass filter across the "power supply." Coil 54 further acts as a choke coil and prevents the current surges delivered to the sound radiator 50 from getting onto the line 9.

The frequency discrimination afforded by the resonant input circuit is further increased by the amplitude gating action of the diode 48. Only when the voltage peaks across the portion of the tuned circuit between a tap 49 on the inductor 45 and the base 42 are greater than about 0.6 volt, the "breakdown" voltage of the diode, is there sufficient base current to drive the transistor.

In order to maintain good selectivity and high sound output, the $\alpha$ of the transistor 41 should be close to unity. This follows from a need to have the transistor reach saturation without putting too great a load on the tuned circuit, and from the fact that the common-emitter configuration current gain is equal to $\alpha/1-\alpha$. The value of $\alpha$ may be effectively increased by adding positive feedback. This feedback is obtained by returning the emitter 43 circuit to the tap 49 on the inductor 45. The amount of feedback is carefully chosen so that oscillation does not occur as a result of a combination of high Q and high $\alpha$.

The diode 51, in series with the collector 44 and the sound radiator 50, provides "talk-off" protection, a term here used to denote disablement of all tone ringers, whenever any one of the subscribers on the line is off-hook. This is necessary since the signalling frequencies lie within the voice frequency range and spurious sounds would emanate from the various sound radiators in response to the speech currents themselves. Described more fully in a copending application of J. R. Power, Serial No. 574,718, filed of even date herewith, diode 51 is a silicon junction breakdown diode similar to diode 17. When all subscribers on the line are on-hook, the potential on the line is sufficient to maintain this diode in its breakdown condition. In its breakdown region, diode 51 represents a negligible alternating-current impedance so that when all sets are on-hook, it absorbs a negligible portion of the power delivered by amplifier 41 to the sound radiator 50. Further, this diode is chosen to have a breakdown voltage sufficient to drop the line voltage to the value normally required for proper operation of the transistor, otherwise the line voltage might exceed the rated maximum collector voltage of the transistor. When any party goes off-hook, the line voltage is dropped by virtue of the added load thereby put on the line, to a value insufficient to maintain breakdown in the diode. With diode bias insufficient to maintain breakdown, diode 51 exhibits its high reverse impedance. In a typical diode, this will be on the order of several megohms. This high impedance, in series with the sound radiator 50, makes any appreciable output from the latter impossible.

When a party goes on-hook, the central office delays action for a fraction of a second before it recognizes the on-hook condition and removes all signalling currents, such as busy signals, which may be on the line. This central office delay is provided to avoid false disconnects in response to momentary switch-hook operation. Were the ringing circuits immediately re-enabled, the tone ringer might be falsely energized by such signals.

As described more fully in a copending application of mine, Serial No. 574,715, filed of even date herewith, since matured into U. S. Patent 2,823,267, issued February 11, 1958, the tone ringer is disabled for this additional fraction of a second by a circuit including resistor 55 and capacitor 56. When the line voltage goes from its off-hook value to its higher on-hook value, this circuit path conducts to charge capacitor 56 to a new value. The charging current for capacitor 56 is drawn through the large feedback resistor 20 and is sufficient in magnitude to hold transistor 12 cut off for the required additional period.

Protection against transients or lightning is afforded by a breakdown diode 57. This diode is similar to diodes 17 and 51 but has a breakdown voltage higher than the normal line voltage. It will, therefore, break down only for excessive voltages and protect the remainder of the circuit, particularly the transistors, from damage. Resistor 58 limits to a safe value the current drawn when diode 57 breaks down.

Although the invention has been described in its relation to a specific embodiment, it should not be deemed limited to the specific embodiment illustrated, since numerous other embodiments and modifications will readily occur to one skilled in the art without departing from the spirit or scope of the invention.

What is claimed is:

1. In combination: a transistor having base, collector, and emitter electrodes, a source of direct current connected to said collector electrode, a source of signals connected to an input circuit which includes said base and emitter electrodes, an output circuit coupled to said collector electrode, a resistor connected in series with said emitter and in common with said input and output circuits, means for biasing said transistor normally conducting whereby, in the absence of said input signals, current from said source flows through said collector, emitter, and resistor, a first by-pass circuit for by-passing around said collector approximately fifty percent of the said current flowing through said resistor, a second by-pass circuit for effectively by-passing said resistor for signals below a predetermined limiting level, and means responsive to input signals which exceed said limiting level for disabling said by-pass circuits.

2. The combination in accordance with claim 1 wherein said biasing means comprise means for applying a substantially constant voltage to said base with respect to the end of said resistor remote from said emitter.

3. The combination in accordance with claim 1 wherein said output circuit is capacitively coupled to said collector.

4. The combination in accordance with claim 1 wherein said resistor is sufficiently large to prevent increases in the current flowing through said collector, when said resistor is not by-passed, despite amplitude increases in said input signals.

5. The combination in accordance with claim 1 wherein said disabling means comprise an asymmetrically conducting impedance element connected in common with said first and second by-pass circuits and poled to conduct in the forward direction for signals below said limiting level.

6. In combination: a transistor having base, emitter, and collector electrodes, an input circuit coupled between said base and emitter electrodes, a source of direct current connected to said collector electrode, an output circuit coupled to said collector, a resistor connected in series with said emitter in common to said input and output circuits, a first by-pass circuit for by-passing said resistor for signal frequencies, constant voltage means connected between said base and emitter for biasing said transistor normally conducting whereby a substantially constant current flows through said resistor, a second by-pass circuit independent of said collector connected between said emitter and said source, said first and second by-pass circuits including a common normally conducting asymmetrically conducting impedance element, and signal source means coupled to said input circuit for driving said transistor between cut-off and a value sufficient to cut off conduction in said asymmetrically conducting impedance element.

7. The combination in accordance with claim 6 wherein said second by-pass circuit is proportioned to by-pass approximately one-half of said constant current around said collector in the absence of said input signals.

8. In combination: a source of signals generally sinusoidal in form and having a predominant fundamental of fairly constant frequency, and circuit means for converting said signals into symmetrical rectangular waves having positive and negative portions, with respect to an arbitrary axis, of substantially identical durations, said circuit means comprising a transistor having base, collector, and emitter electrodes, means for applying said signals between said base and a reference point, a negative feedback resistor connected between said emitter and said point, a load resistor connected between said collector and a source of direct-current voltage, an output circuit coupled between said collector and said point, means comprising a source of substantially constant voltage for biasing said transistor conducting whereby current normally flows through said resistor, emitter, and collector electrodes, means for by-passing approximately fifty percent of the current flowing through said resistor around the emitter and collector electrodes of said transistor, and means for disabling said by-passing means for input signals which exceed a predetermined limiting level.

9. In combination: a source of signals generally sinusoidal in form and having a predominant fundamental of fairly constant frequency, and circuit means for converting said signals into symmetrical rectangular waves having positive and negative portions, with respect to an arbitrary axis, of substantially identical durations, said circuit means comprising a transistor having base, collector, and emitter electrodes, means for applying said signals between said base and a reference point, a negative feedback resistor connected between said emitter and said point, a load resistor connected between said collector and a source of direct-current voltage, an output circuit coupled between said collector and said point, means comprising a source of substantially constant voltage for biasing said transistor conducting whereby current normally flows through said emitter and collector electrodes, means for by-passing approximately fifty percent of said current around the emitter and collector electrodes of said transistor, and means for disabling said by-passing means for input signals which exceed a predetermined limiting level, means for effectively by-passing said resistor for input signals below said limiting level and means responsive to the disabling of said by-pass means for effectively disabling the by-passing of said resistor.

10. In combination with a load circuit having a frequency selective resonant input circuit tuned to a desired frequency, a source of alternating-current signals having a fundamental approximately equal to said desired frequency, and means for deriving from said signal source a driving current for said resonant circuit which has a substantially constant peak-to-peak amplitude and which is substantially devoid of second harmonic components of said fundamental, said means comprising a transistor having base, emitter, and collector electrodes, a source of direct current connected to said collector electrode, means for applying said signals to an input circuit for said transistor which includes said base and emitter electrodes, capacitive means for coupling said collector to said resonant input circuit, a current stabilizing resistor connected in series with said emitter, constant voltage means for biasing said transistor conducting in the absence of input signals whereby a substantially constant current flows through said resistor in the absence of said input signals, first by-pass circuit means for by-passing approximately one-half of said substantially constant current around said collector electrode, second by-pass circuit means for by-passing said resisor for input signal amplitudes, in one direction of swing, below a predetermined level, means responsive to input signals which exceed said predetermined level for disabling said first and second by-pass circuits and said input signals having a sufficient amplitude to drive said transistor to cut-off in the other direction of swing.

11. The combination in accordance with claim 10 wherein said disabling means comprise an asymmetrically conducting impedance element connected in common with both said first and said second by-pass circuits and biased conducting for signals below said predetermined level and nonconducting for signals exceeding said predetermined level.

12. In combination: a transistor having base, collector, and emitter electrodes, a source of direct current connected to said collector electrode, an input circuit for applying signals varying in amplitude to said base electrode, an output circuit coupled to said collector electrode, and circuit means for limiting the maximum output current to a desired value comprising a first resistor connected in series with said emitter electrode and in common with said input and output circuits, a diode having one electrode connected to the junction of said emitter and said first resistor, a capacitor connected across said diode and said first resistor, and a second resistor connected between said source of direct current and the junction of said capacitor and said diode.

References Cited in the file of this patent

UNITED STATES PATENTS 2,680,160 Yaeger ---------------- June 1, 1954

OTHER REFERENCES

Ettinger: "Transistor Amplifiers For Analog Computers," Electronics, July 1955, pp. 119 to 121.

Turner: "Transistors Theory and Practice," Gernspack Publications Inc., New York, 1954, Fig. 402*a*, p. 48 relied on.